United States Patent
Saito et al.

(10) Patent No.: US 7,784,271 B2
(45) Date of Patent: Aug. 31, 2010

(54) SCHEME FOR DETECTING DETERIORATION OF A CATALYST IN AN ENGINE

(75) Inventors: Kiyoshi Saito, Saitama (JP); Eisaku Gosyo, Saitama (JP); Hiroaki Nishino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 685 days.

(21) Appl. No.: 11/790,535

(22) Filed: Apr. 26, 2007

(65) Prior Publication Data

US 2007/0251213 A1 Nov. 1, 2007

(30) Foreign Application Priority Data

Apr. 27, 2006 (JP) .............................. 2006-123174

(51) Int. Cl.
*F02B 27/04* (2006.01)
*F01N 3/00* (2006.01)

(52) U.S. Cl. .............................. 60/277; 60/273; 60/285

(58) Field of Classification Search .................... 60/274, 60/277, 285, 273, 276

See application file for complete search history.

(56) References Cited

U.S. PATENT DOCUMENTS 6,622,081 B2 * 9/2003 Wada .......................... 701/114

FOREIGN PATENT DOCUMENTS

| JP | 07-019033 A | 1/1995 |
| JP | 07-151002 A | 6/1995 |
| JP | 07-189780 A | 7/1995 |

* cited by examiner

*Primary Examiner*—Thomas E Denion
*Assistant Examiner*—Audrey Klasterka
(74) *Attorney, Agent, or Firm*—Arent Fox LLP

(57) ABSTRACT

Deterioration of a catalyst provided in an exhaust system of the engine is determined. Air-fuel ratio sensors are provided in the upstream side and the downstream side of the catalyst. Air-fuel ratio is changed. Based on the sensor outputs in the upstream die and the downstream side of the catalyst, a parameter of a catalyst model representing a state of the catalyst is identified. The parameter is compared with a threshold to determine a state of the catalyst.

20 Claims, 7 Drawing Sheets

A/F Ratio on the Upstream Side of the Catalyst

SCHEME FOR DETECTING DETERIORATION OF A CATALYST IN AN ENGINE

BACKGROUND OF THE INVENTION

The present invention relates to an apparatus for detecting deterioration of a catalyst disposed in an internal-combustion engine, and more particularly it relates to an apparatus for detecting deterioration of a catalyst based on an oxygen storage capacity of the catalyst.

As an example of techniques for detecting deterioration of a catalyst placed in an exhaust system and having oxygen storage capacity (OSC), Japanese Patent Application Publication No. H7-189780 discloses an apparatus for detecting deterioration of a catalyst by changing air-fuel ratio of exhaust gas in a certain cycle and monitoring the behavior of air-fuel ratio in the downstream side of the catalyst when air-fuel ratio of exhaust gas is changed in certain cycle.

Japanese Patent Application Publication No. H7-19033 discloses a technique for determining deterioration of a catalyst by measuring air-fuel ratios in the upstream and downstream sides of the catalyst by changing air-fuel ratio of exhaust gas from lean to rich or from rich to lean. Catalyst deterioration is determined based on time delays in alteration of the air-fuel ratio in the downstream side of the catalyst.

Japanese Patent Application Publication No. H7-151002 discloses a technique that uses various kinds of sensor information and a model representing an OSC of a normal catalyst to calculate an OSC of a current catalyst to determine deterioration of the current catalyst when the calculated OSC is less than a predetermined OSC.

In the technique discussed in the above-mentioned Publication No. H7-189780, air-fuel ratio of the exhaust gas needs be changed in a certain cycle, which may produce bad emission. Besides, according to the technique disclosed in the above-referenced Publication No. H7-19033, the catalyst deterioration must be determined based on instantaneous values. This would produce inaccurate detection due to dispersion of measurement capabilities of sensors, engine operating environments and so on. The technique disclosed in the above-referenced Publication No. H7-151002 is very complicated in the design of a model representing OSC of the normal catalyst, needing large sensor information for developing the model.

Thus, it is an objective of the present invention to provide a catalyst deterioration detecting scheme that is capable of accurately determining the catalyst deterioration.

SUMMARY OF THE INVENTION

In accordance with the present invention, air-fuel ratio sensors are provided at upstream and downstream of the catalyst for measuring air-fuel ratio of the exhaust gas, the catalyst being provided in an exhaust system of the engine for purifying exhaust gas. The apparatus according to the invention includes means for controlling air-fuel ratio in accordance with a target air-fuel ratio, and means, based on the air-fuel ratios on the upstream and downstream sides of the catalyst, for identifying a parameter of a catalyst model representing deterioration state of the catalyst in accordance with a alteration of the air-fuel ratio. The apparatus also includes means for determining catalyst deterioration based on the identified parameter.

According to the invention, since deterioration of the catalyst is determined using the catalyst model that is easy to identify, catalyst deterioration can be determined accurately based on air-fuel ratio at the upstream and downstream sides of the catalyst.

According to one aspect of the present invention, identification means sets the number of samplings and sampling periods for the upstream and downstream air-fuel ratios to be used for identifying the parameters based on at least one of an exhaust gas flow amount, an exhaust gas temperature, a catalyst temperature and a variation degree of the target air-fuel ratio or a variation amount of the air-fuel ratio.

According to another aspect of the present invention, the deterioration determining means sets a threshold value depending on an oxygen adsorption amount of the catalyst, a catalyst temperature or the target air-fuel(A/F) ratio and determines catalyst deterioration by comparing the parameter with the threshold value.

DESCRIPTION OF THE PREFERRED EMBODIMENTS

Figure 1:
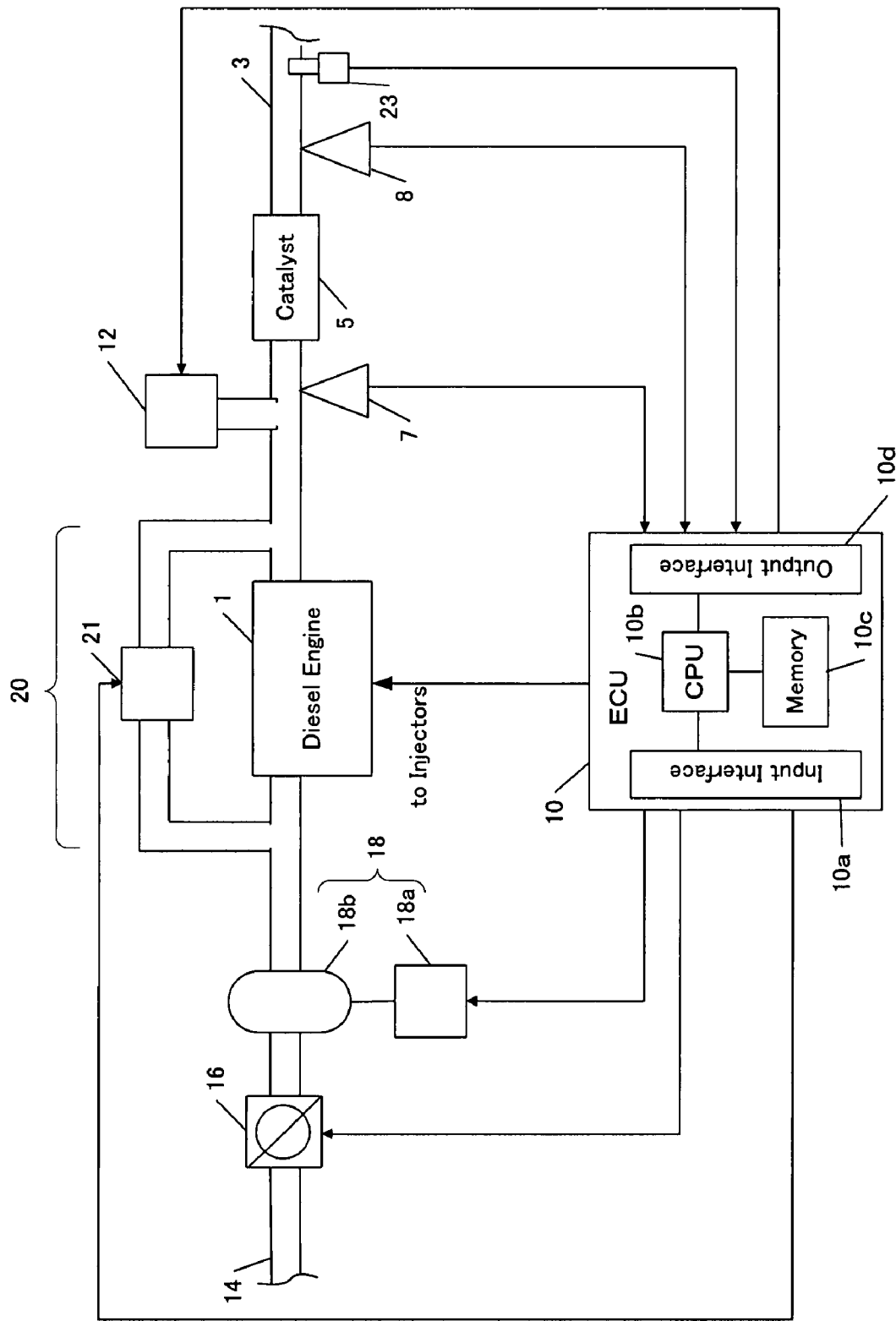
FIG. 1 is a block diagram showing a structure of an internal-combustion engine and its control unit in association with the present invention.

A preferred embodiment of a catalyst deterioration detecting apparatus according to the present invention will be described below with reference to the accompanying drawings. FIG. 1 is a block diagram showing a structure of an engine and its control unit that are related with the present invention.

An engine 1, in this embodiment, is a diesel engine wherein high pressure fuel is injected into combustion chamber of each cylinder and is compressed to ignite naturally. The diesel engine 1 controls its output by adjusting fuel injection amounts and injection timing of injectors (not illustrated in the drawings) provided to the engine cylinders for injecting fuel. Each injector injects fuel at an optimum timing according to operating conditions as controlled by a control command from an electric control unit (ECU).

A catalyst 3 is provided in an exhaust pipe 2 of the diesel engine 1. The catalyst 3 is a lean NOx catalyst (LNC) that occludes nitrogen oxides (NOx) discharged during a lean A/F operation and reduces the occluded NOx during a rich A/F operation.

Linear air-fuel ratio (LAF) sensors 7, 8 are disposed respectively upstream and downstream of the catalyst 3. The LAF sensors 7, 8 output electric signals that are approximately proportional to air-fuel ratio of exhaust gas at upstream and downstream sides of the catalyst 3. The outputs of the LAF sensors are sent to the ECU 10.

Additionally, a secondary air pump 12 is provided within the exhaust pipe 2. The secondary air pump 12 introduces air into the exhaust pipe 2 to mix the air with the exhaust gas. The amount of air introduced by the secondary air pump 12 is controlled by a control command from the ECU 10.

An intake shutter 16 is provided in an air intake pipe 14 of the diesel engine 1. The intake shutter 16 has the same mechanism as a throttle valve in a gasoline engine. In case of the diesel engine, however, the engine output is controlled by adjustment of the fuel injection amount while the amount of the intake air is usually kept unadjusted. Therefore, the intake shutter is kept fully open during a normal operation. The intake shutter 16 is moved toward a closing side in order to throttle the intake air for special purposes such as for increasing an exhaust gas temperature. For example, in order to burn the particle matters (PM) collected in a diesel particulate filter (not illustrated in the drawings) provided at downstream of the catalyst 3, the intake shutter is moved toward the closing side to throttle the intake air to raise the exhaust gas temperature for burning the PM.

A turbo-charger 18 is provided in the air intake pipe 14. The turbo-charger 18 is an electrically-driven turbo-charger that compresses the intake air with rotation of a compressor 18b which is driven by a motor 18a. The degree of compression of the intake air by the turbo-charger 18 is controlled by a control command from the ECU 10. By virtue of the turbo-charger 18, the combustion efficiency of the engine is improved and the engine output rises because more air can be introduced into engine cylinders for the same engine displacement.

An exhaust gas recirculation unit (EGR) 20 is provided between the air intake pipe 14 and the exhaust pipe 3. The EGR 20 re-introduces the exhaust gas into the air intake pipe 14 to mix it with the intake air, thus lowering the combustion temperature so that production of nitrogen oxides NOx is decreased. The optimal flow amount of the re-circulated exhaust gas is determined by the electronic control unit, ECU 10. The amount of the re-circulated exhaust gas is controlled by adjusting an EGR valve 21. The EGR valve 21 is controlled by a control command from the ECU 10 to control the amount of re-circulated exhaust gas. In the present embodiment, the air amount introduced into the engine is controlled during normal operation by adjusting the EGR valve 21.

A series of processes for determining the deterioration of the catalyst according to the present embodiment are performed by computer programs installed in the ECU 10.

The ECU 10 includes an input interface 10a for receiving data received from various parts of a vehicle and a processor, CPU 10b for performing computations for controlling various parts of the vehicle. ECU10 also includes a memory 10c having a Read-Only Memory (ROM) and a Random Access Memory (RAM). The ROM stores computer programs and data required for controlling each section of the vehicle. The RAM provides a working space for the CPU and temporarily stores data and program. The ECU includes an output interface 10d for sending control signals to various parts of the vehicle.

Programs for performing the catalyst deterioration detection according to the present embodiment as well as data and tables to be used for executing those programs are stored in the ROM. The ROM may be a re-writable type of ROM such as an EPROM. The RAM provides a working space for the CPU 10b for its calculations. The data received from various parts of the vehicle and the control signals to be sent out to various parts of the vehicle are temporarily stored in the RAM.

Now, a catalyst deterioration detecting scheme according to one embodiment of the present invention will be described.

Figure 2:
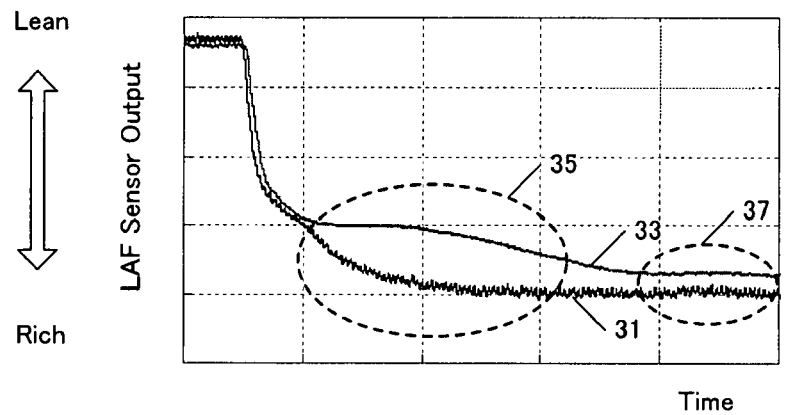
FIG. 2 is a graph showing transitional responses of air-fuel ratios before and after a catalyst when a target air-fuel ratio has been changed from lean to rich.

FIG. 2 is a graph showing transitional response of air-fuel ratio at upstream and downstream sides of a catalyst when a target air-fuel ratio is changed from lean to rich. A vertical axis of the graph is output of the LAF sensors 7, 8. The air-fuel ratio is leaner as it rises higher along the vertical axis. A line shown by reference number 31 is a measurement value by the LAF sensor located at the upstream side of the catalyst, which represents an air-fuel ratio at the upstream side of the catalyst. A line shown by reference number 33 is a measurement value by the LAF sensor located at the downstream side of the catalyst, which represents an air-fuel ratio at the downstream side of the catalyst.

Referring to FIG. 2, in case of a normal catalyst, when an air-fuel ratio control is performed by switching the target air-fuel ratio from lean to rich, there appears a characteristic difference in the air-fuel ratio on the upstream and downstream sides of the catalyst as shown in a region 35. This difference is caused by the oxygen storage capacity (OSC) of the catalyst. The catalyst stores oxygen in the catalyst when the air-fuel ratio is lean. As the air-fuel ratio becomes richer than the stoichiometric air-fuel ratio, the catalyst releases the oxygen that is stored in the catalyst. While the oxygen is being released by the catalyst, an amount of oxygen in the downstream side of the catalyst increases and the air-fuel ratio 33 in the downstream side of the catalyst becomes leaner in comparison with the air-fuel ratio 31 in the upstream side. At this time, the characteristic difference as can be seen in region 35 is generated between the upstream air-fuel ratio 31 and the downstream air-fuel ratio 33.

On the other hand, when the catalyst deteriorates, the characteristic difference as observed in region 35 does not appear because the catalyst fails to store oxygen during a lean operation. The air-fuel ratio in the downstream side of the catalyst follows the change in the upstream air-fuel ratio. As deterioration of the catalyst grow larger, the difference between the air-fuel ratios in the upstream and downstream becomes smaller.

Since a behavior of the characteristics of a normal catalyst as shown in region 35 is determined by various factors such as the operation environment of the engine and others, development of an accurate model for the normal catalyst needs a large sensor information and designing of the model becomes very complicated. On the other hand, as for the deteriorated catalyst, modeling is easier because the downstream air-fuel ratio follows the upstream air-fuel ratio.

Accordingly, in this embodiment, a model of a deteriorated catalyst is first developed and then actual air-fuel ratios in the upstream and downstream of the catalyst are compared with the developed model. When the behavior of the actual air-fuel ratios is close to that of the deteriorated catalyst model, the catalyst is determined to have deteriorated.

Figure 3:
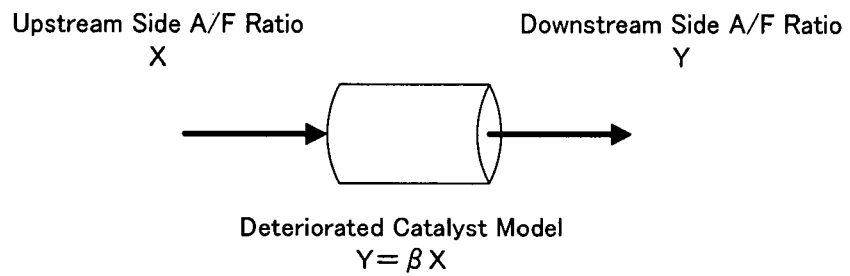
FIG. 3 shows a model of a deteriorated catalyst to be used in one embodiment of the present invention.

FIG. 3 illustrates a deteriorated catalyst model to be used in the present embodiment. The air-fuel ratio in the upstream side of the catalyst is denoted by X and the downstream side air-fuel ratio is denoted by Y. The deteriorated catalyst model is expressed as in Equation (1).

$$Y = \beta \cdot X \qquad (1)$$

Where $\beta$ is a constant. As $\beta$ is closer to 1, the air-fuel ratios in the upstream and downstream sides of the catalyst take almost equal values, indicating that deterioration of the catalyst has progressed.

In the present embodiment, the upstream air-fuel ratio X1 to Xn and the downstream air-fuel ratio Y1 to Yn are sample values measured in a predetermined number of samplings and a predetermined sampling period. By using these data, the parameter $\beta$ of the deteriorated catalyst model is identified.

In the present embodiment, the method of least squares is used for identifying the parameter $\beta$. In other words, the parameter $\beta$ is obtained in the condition that the sum of squares ($S_{error}$) of difference between the output of the deteriorating model as calculated by Equation (1) and the measurement value Yi of the downstream air-fuel ratio becomes smallest. $S_{error}$ is specifically expressed by Equation (2).

$$S_{error} = \sum_{i=1}^{n}(Y_i - \beta X_i)^2 \qquad (2)$$

Equation (2) can be expanded as in Equation (2)'.

$$S_{error} = a\left(\beta - \frac{X_1 Y_1 + X_2 Y_2 + \ldots + X_n Y_n}{X_1^2 + X_2^2 + \ldots X_n^2}\right)^2 + b \qquad (2)'$$

where $$a = X_1^2 + X_2^2 + \ldots X_n^2$$

$$b = \frac{(X_1 Y_1 + X_2 Y_2 + \ldots + X_n Y_n)^2}{X_1^2 + X_2^2 + \ldots X_n^2} + (Y_1^2 + Y_2^2 + \ldots Y_n^2)$$

Figure 4:
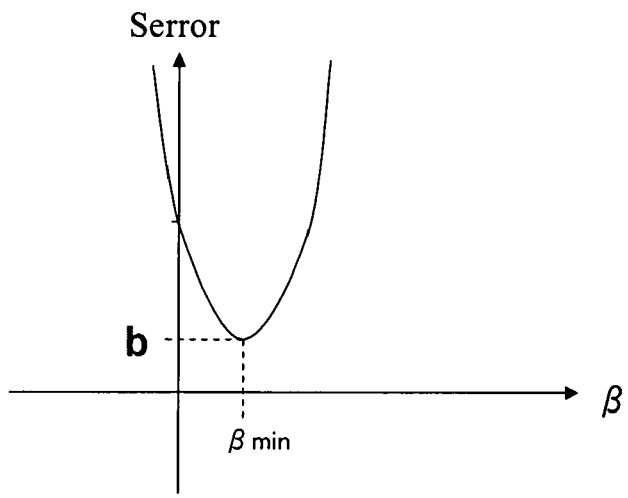
FIG. 4 is a graph showing a relation of a deteriorated catalyst model and a sum of squares of errors ($S_{error}$) about measured air-fuel ratios with a parameter $\beta$.

$S_{error}$ is a quadric function of $\beta$ and can be illustrated as in FIG. 4. $S_{error}$ takes the minimum value $S_{error}$=b when parameter $\beta$ takes a minimal $\beta_{min}$ as shown in Equation (3).

$$\beta_{min} = \frac{X_1 Y_1 + X_2 Y_2 + \ldots + X_n Y_n}{X_1^2 + X_2^2 + \ldots X_n^2} \qquad (3)$$

Here, the minimal $\beta_{min}$ of $S_{error}$ is the most suitable identification parameter that can best represent the deteriorated catalyst model in the current identification process. According to Equation (3), the identification parameter $\beta_{min}$ can be calculated from the upstream air-fuel ratio sample values X1 to Xn and the downstream air-fuel ratio sample values Y1 to Yn that have been measured by the LAF sensors.

In the present embodiment, deterioration of the catalyst is determined in accordance with the magnitude of the identification parameter $\beta_{min}$ calculated according to Equation (3). In case of the deteriorated catalyst, $\beta_{min}$ takes a value that is close to 1 because the air-fuel ratio in the downstream side of the catalyst follows the upstream air-fuel ratio. In case of a normal catalyst, $\beta_{min}$ takes a larger value away from 1 because a larger difference is generated between the air-fuel ratios in the upstream and downstream sides as shown in the region 35 of FIG. 2.

Figure 5:
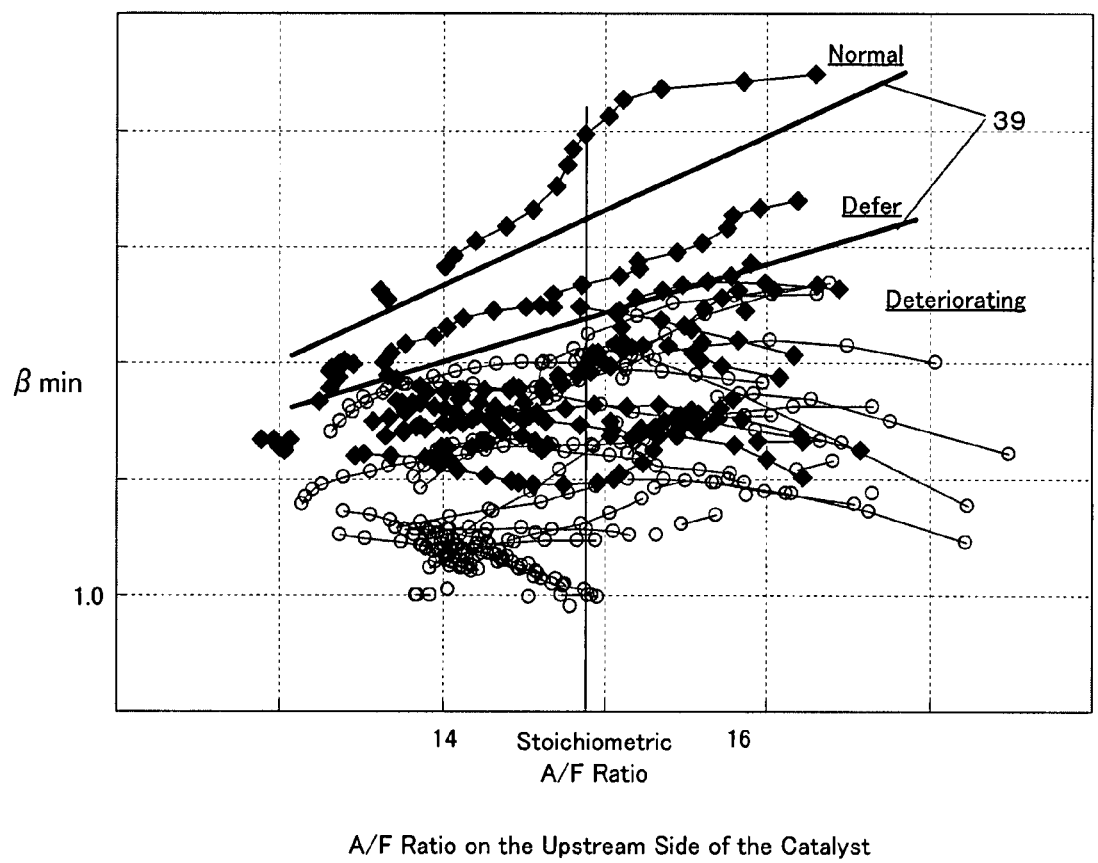
FIG. 5 is a graph showing a characteristic of an identification parameter $\beta$min of a deteriorated catalyst model.

FIG. 5 is a graph showing characteristics of the identification parameter $\beta_{min}$ of the deteriorated catalyst model. A horizontal axis of the graph is the air-fuel ratio on the upstream side of the catalyst when the measurement values of the LAF sensor are sampled for identifying the $\beta_{min}$. A vertical axis of the graph represents the identification parameter $\beta_{min}$ calculated by Equation (3). Lozenge-shaped dots in FIG. 5 indicate the characteristics according to a normal catalyst whereas circular dots indicate characteristics of a deteriorated catalyst. Connected dots are those having the same amount of oxygen adsorbed in the catalyst during lean operation.

It is observed from FIG. 5 that when the catalyst deteriorates, the identification parameter $\beta_{min}$ moves toward the value of 1, contrary to the situation when the catalyst is normal. Therefore, for example, by establishing a threshold value to be used for determination of deterioration as shown by a straight line 39 in FIG. 5, a region may be defined by the identification parameter $\beta_{min}$ where deteriorated catalysts lie.

Figure 6:
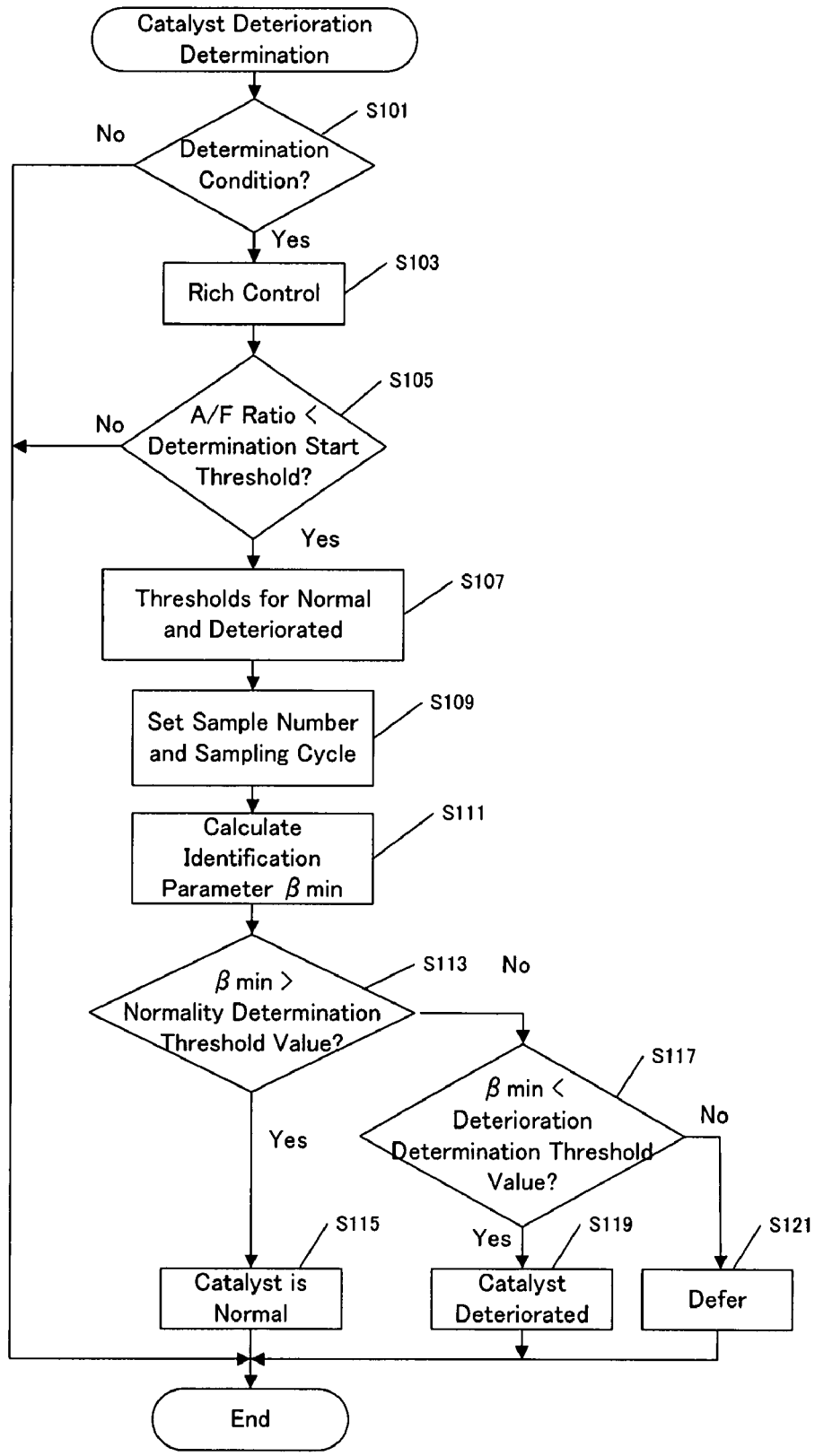
FIG. 6 is a flowchart of the process for determining catalyst deterioration in accordance with one embodiment of the present invention.

FIG. 6 is a flowchart of a process for determining deterioration of a catalyst according to the present embodiment.

In Step 101, whether or not condition for performing the catalyst deterioration determination are met is checked. A condition for determining the catalyst deterioration is, for example, that the exhaust gas temperature or the catalyst temperature is within a predetermined range, that the amount of discharged NOx that is estimated from the engine operating conditions (engine rotational speed or engine load) is larger than a predetermined value, that the engine operating conditions such as engine rotational speed, engine load, engine water temperature, intake air temperature or the like are within a predetermined range, that a request for detecting the deterioration of the catalyst has been received, and that an exhaust gas flow amount, oxygen concentration value on upstream and downstream sides of the catalyst or the amount of oxygen adsorbed in the catalyst which is estimated from an exhaust gas temperature exceeds a predetermined value, and so on.

When a part or all of these conditions are satisfied, the catalyst deterioration determination condition is satisfied. When the catalyst deterioration determination condition is satisfied, the process goes to Step S103, in which the catalyst deterioration determination is started. When the catalyst deterioration determination condition is not satisfied, the process is exited.

In Step S103, a control for enriching the air-fuel ratio of the exhaust gas is started. In this process, in order to create a rich state in the exhaust gas, post-injection may be performed by injecting fuel into the engine cylinder in a combustion stroke and/or in an exhaust stroke of the piston so that non-combusted fuel is added to the exhaust gas. Further, the intake-shutter valve may be controlled to limit intake air. EGR may also be controlled to produce rich state in the exhaust gas.

In Step S105, it is checked whether or not the air-fuel ratios in the upstream and downstream sides of the catalyst exceed a determination starting threshold value. This threshold value may be set to a value that is around the stoichiometric air-fuel ratio. The air-fuel ratio is rich when it is smaller than the determination starting threshold value. When the air-fuel ratio is smaller than the threshold value, the process goes to Step S107. When the air-fuel ratio is larger than the threshold value, the process is exited.

In Step S107, a threshold value for determining deterioration is set based on the amount of oxygen adsorbed in the catalyst and the target air-fuel ratio. This threshold value is established according to the following procedure:

First, a base threshold for use with determination of normal and a base threshold for use with determination of deterioration are read out from the memory 10c. The threshold data have the characteristics, as shown by the straight line 39 in FIG. 5, responsive to the air-fuel ratio (LAF sensor output) in the upstream side of the catalyst.

Figure 7:
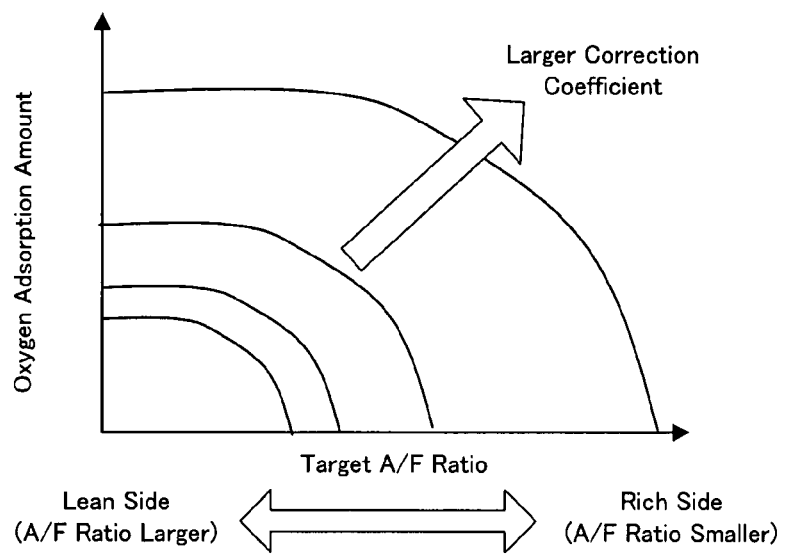
FIG. 7 is a graph showing a relation of an oxygen adsorption amount and a target air-fuel ratio with a correction coefficient for a determination threshold value.

Next, a correction coefficient is obtained based on the oxygen adsorption amount and the target air-fuel ratio. The correction efficient is set to a larger value proportionally as the target air-fuel ratio becomes smaller (that is, richer). It is set to a larger value proportionally as the oxygen adsorption amount becomes larger. The correction coefficient is obtained, for example, by using a correction coefficient map, as shown in FIG. 7, which is based on the target air-fuel ratio and the oxygen adsorption amount.

Then, the threshold for determining normal is calculated by multiplying the correction coefficient to the base threshold for determining normal. The threshold for determining deterioration is calculated by multiplying the correction coefficient to the base threshold for determining deterioration.

Figure 8:
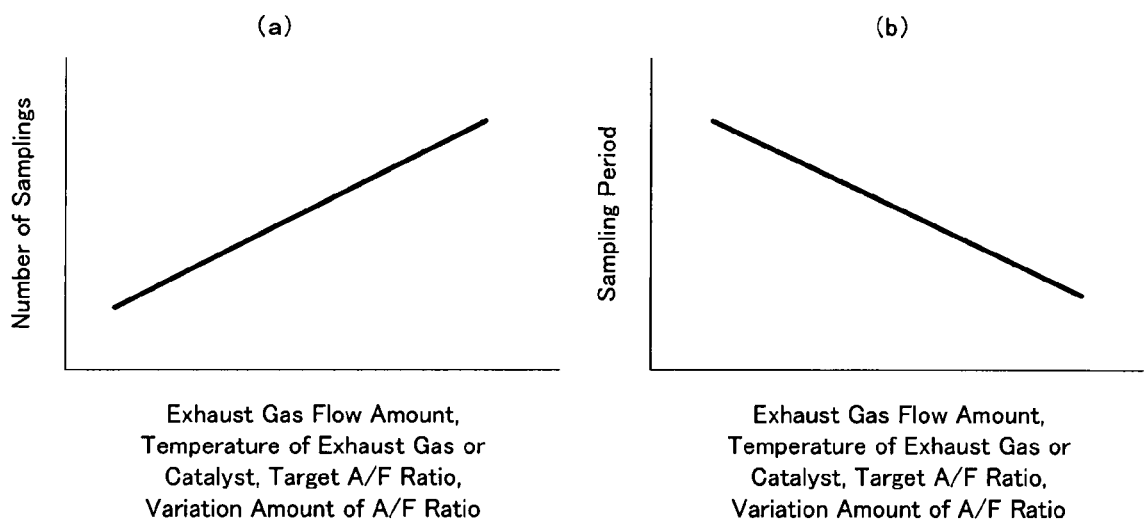
FIG. 8 is a graph showing a relation of an exhaust gas flow amount, a temperature of an exhaust gas or a catalyst, a target air-fuel ratio and a variation of air-fuel ratios with a sampling cycle and the number of samples.

In Step S109, the number of samplings and the sampling period for the upstream air-fuel ratio and the downstream air-fuel ratio are set. The number of samplings and the sampling period are established by using maps as shown in FIGS. 8(a) and (b), which are on the basis of at least one of exhaust gas flow amount, temperature of the catalyst or the exhaust gas, magnitude of the target air-fuel ratio, and variation of the air-fuel ratio.

In Step S111, the identification parameter $\beta_{min}$ is calculated according to Equation (3) by using the LAF sensor outputs X1 to Xn, Y1 to Yn which are measured and sampled from the output of the LAF sensors. As for the LAF sensor outputs Y1 to Yn on the downstream side of the catalyst, a time delay for passing through the catalyst is calculated based on the exhaust gas flow amount. Considering this time delay, the LAF sensor outputs Y1 to Yn on the downstream side of the catalyst corresponding to the LAF sensor outputs X1 to Xn on the upstream side of the catalyst are measured.

In Step S113, it is checked whether or not the identification parameter $\beta_{min}$ is larger than the threshold value for determining a normal. In accordance with the air-fuel ratio (LAF sensor output) in the upstream side of the catalyst when the identification parameter $\beta_{min}$ is calculated, the threshold value for determining a normal is selected from the threshold data calculated in Step S107. When the identification parameter $\beta_{min}$ is larger than the threshold for determining a normal, the catalyst is determined normal (S115). When the identification parameter $\beta_{min}$ is equal to or smaller than the threshold for determining a normal, the process goes to Step S117.

In Step S117, it is checked whether or not the identification parameter $\beta_{min}$ is smaller than the threshold value for determining a deterioration. In accordance with the air-fuel ratio (LAF sensor output) in the upstream side of the catalyst when the identification parameter $\beta_{min}$ is calculated, the threshold value for determining deterioration is selected from the threshold data calculated in Step S107. When the identification parameter $\beta_{min}$ is smaller than the threshold, the catalyst is determined to be deteriorated (S119). When the identification parameter $\beta_{min}$ is equal to or larger than the threshold, the process goes to Step S121, in which determination of catalyst deterioration is deferred because the identification parameter $\beta_{min}$ is not in the region of normal catalysts and not in the region of deteriorated catalysts either.

In this embodiment, after the above-described deterioration determining process in association with the region 35 of FIG. 2, a second deterioration determining process can be performed. Referring to FIG. 2, as characteristics of a normal catalyst, it is observed that after the air-fuel ratio of the exhaust gas has reached the target air-fuel ratio (after the transitional region 35), a certain difference exists between the air-fuel ratio 31 at the upstream side of the catalyst and the air-fuel ratio 33 at the downstream side of the catalyst over a certain time period. Such difference becomes larger as the degree of activity of the catalyst is larger.

Now, considering the identification parameter $\beta_{min}$ of the deteriorated catalyst model, $\beta_{min}$ takes a larger value even in the region 37 because the difference is relatively large with respect to a normal catalyst. In contrast, when the catalyst has deteriorated, the difference becomes smaller and the value of $\beta_{min}$ approaches 1.

By utilizing such characteristics of $\beta_{min}$, the second deterioration determining process is performed based on the identification parameter $\beta_{min}$ of the deteriorated catalyst model when the air-fuel ratio has moved from a transitional state to a stationary state.

Figure 9:
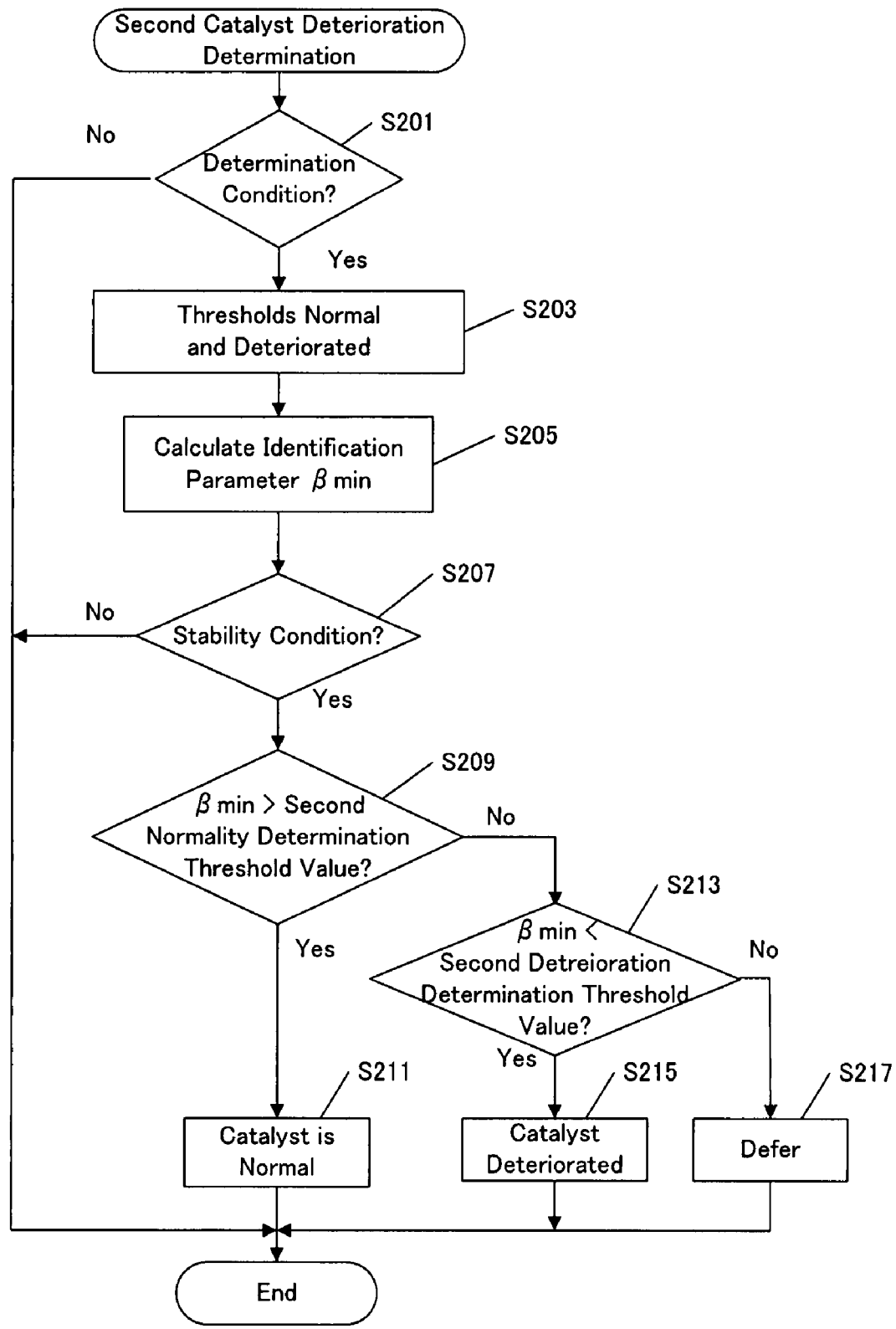
FIG. 9 is a flowchart of a second catalyst deterioration determination process in accordance with one embodiment of the present invention.

FIG. 9 is a flowchart of the second deterioration determining process according to the present embodiment.

In Step 201, it is checked whether or not a condition for performing the second catalyst deterioration determination is met. The condition for determining the catalyst deterioration is, for example, that the catalyst deterioration determination during the transitional state as described above with reference to FIG. 6 has been "deferred", that the difference between the current air-fuel ratio of the exhaust gas and the target air-fuel ratio is within a predetermined range. The other condition may also apply. When a part or all of these conditions are satisfied, the catalyst deterioration determination condition is satisfied, and the process goes to Step S203, in which the second deterioration determination starts. When the catalyst deterioration determination condition is not satisfied, the process is exited.

In Step S203, a determination threshold value is established based on the amount of the oxygen adsorbed in the catalyst and the target air-fuel ratio. This determination threshold value takes a smaller value than the value that has been used in the deterioration determination process during the transitional state. The second determination threshold value is established according to the following procedure:

First, the second base threshold to be used for determining the catalyst to be normal and the second base threshold to be used for determining the catalyst to be deteriorated are read out from the memory 10c. The thresholds have characteristics corresponding to the air-fuel ratio (LAF sensor output) in the upstream side of the catalyst. Since the air-fuel ratio is already in a stationary state on the rich side when the second deterioration determination is performed, the difference between the air-fuel ratio in the upstream of the catalyst and that in the downstream of the catalyst is smaller than that in the transitional state. Therefore, the identification parameter $\beta_{min}$ takes a value closer to 1 than in the transitional state. The second base thresholds have smaller values than the base thresholds in the transitional state shown by the straight line 39 in FIG. 5.

Figure 10:
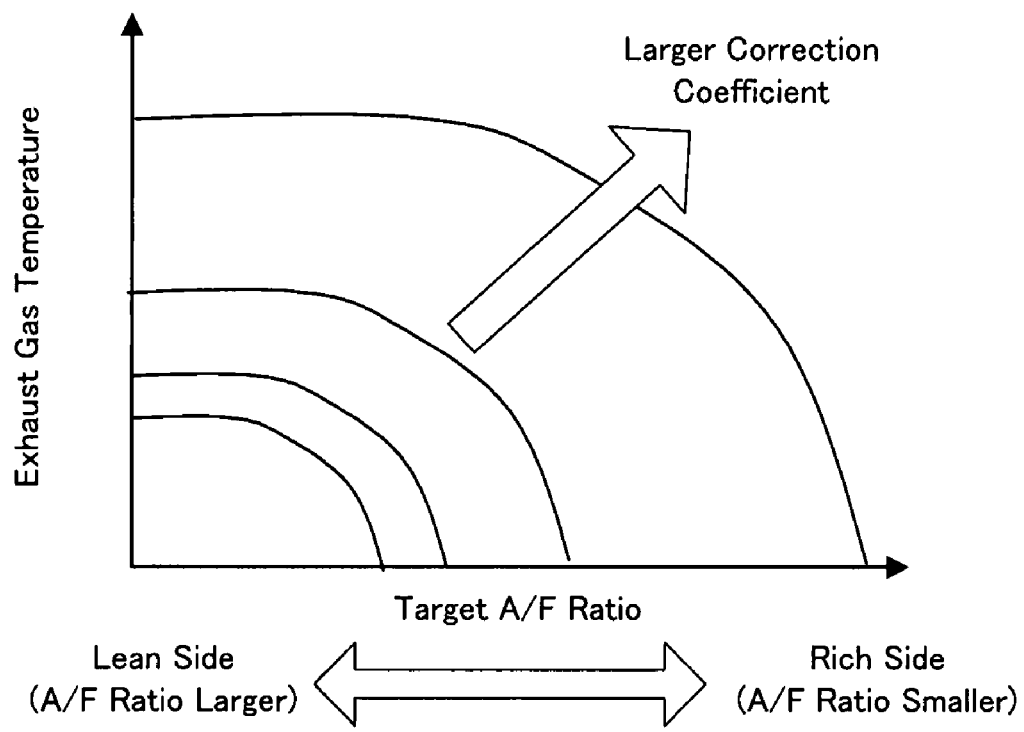
FIG. 10 is a graph showing a relation of an exhaust gas temperature and a target air-fuel ratio with a correction coefficient for a second determination threshold value.

Next, a correction coefficient is obtained based on the exhaust gas temperature and the target air-fuel ratio. The correction efficient is set to a larger value proportionally as the target air-fuel ratio becomes smaller (that is, richer) and also it is set to a larger value proportionally as the exhaust gas temperature becomes higher. The correction coefficient is obtained, for example, by using a correction coefficient map, as shown in FIG. 10, which is on the basis of the target air-fuel ratio and the exhaust gas temperature.

Then, the second threshold for determining a normal and the second threshold for determining a deterioration are calculated by multiplying the correction coefficient to the second base threshold for determining a normal and to that for determining a deterioration.

In Step S205, sampling is performed on the LAF sensor outputs using the predetermined sampling period and the predetermined number of the samplings. Using the measured X1 to Xn and Y1 to Yn, the identification parameter B is calculated according to Equation (3). As for the LAF sensor outputs Y1 to Yn in the downstream side of the catalyst, a time delay for passing through the catalyst is calculated based on the exhaust gas flow amount. Considering this time delay, the LAF sensor outputs Y1 to Yn in the downstream side of the catalyst corresponding to the LAF sensor outputs X1 to Xn in the upstream side of the catalyst are measured.

In Step S207, it is checked whether or not a stability condition is satisfied. This stability condition indicates if the air-fuel ratio has passed the transitional state and is in a stable state as shown by the region 37 of FIG. 2. The stability condition is satisfied specifically when a variation value d ($\Delta A/F$)/dt of a difference pressure $\Delta A/F$ between upstream and downstream sides of the catalyst or a variation value d ($\beta_{min}$)/dt of the identification parameter $\beta_{min}$ is within a predetermined range around 0 over a certain time period. When the stability condition is satisfied, the process goes to Step S209. When the stability condition is not satisfied, the process is exited.

In Step S209, it is checked whether or not the identification parameter $\beta_{min}$ is larger than a second threshold value for determining a normal. In accordance with the air-fuel ratio (LAF sensor output) in the upstream side of the catalyst when the identification parameter $\beta_{min}$ is calculated, the second threshold value for determining a normal is selected from the second threshold data calculated in Step S203. When the identification parameter $\beta_{min}$ is larger than the second threshold for determining a normal, the catalyst is determined to be normal (S211). When the identification parameter $\beta_{min}$ is equal to or smaller than the second threshold for determining a normal, the process goes to Step S213.

In Step S213, it is checked whether or not the identification parameter $\beta_{min}$ is smaller than a second threshold value for determining a deterioration. In accordance with the air-fuel ratio (LAF sensor output) in the upstream side of the catalyst when the identification parameter $\beta_{min}$ is calculated, the second threshold value for determining a deterioration is selected from the second threshold data calculated in Step S203. When the identification parameter $\beta_{min}$ is smaller than the second threshold for determining a deterioration, the catalyst is determined to have deteriorated (S215). When the identification parameter $\beta_{min}$ is equal to or larger than the second threshold for determining a deterioration, the process goes to Step S217, in which the deterioration determination is deferred because the identification parameter $\beta_{min}$ is not in the region of a normal catalyst and not in the region of a deteriorated catalyst either.

The present invention has been described above with reference to the specific embodiment. However, the present invention should not be limited to such specific embodiment. Although the determination of the deterioration has been explained about the reduction type of catalyst in the diesel engine in the above-described embodiment, the deterioration determination technique according to the present invention can be applied to a three-way catalyst of a gasoline engine as well.

What is claimed is:

1. An apparatus for detecting deterioration of a catalyst provided in an exhaust system of an internal-combustion engine, the apparatus comprising:
   air-fuel ratio sensors provided in the upstream side and the downstream side of the catalyst for measuring air-fuel ratio in the exhaust gas;
   means for changing the air-fuel ratio in the exhaust gas;
   means for identifying a parameter $\beta$ of a catalyst model representing deterioration state of the catalyst in accordance with variation of the air-fuel ratio in the upstream side and the downstream side of the catalyst as measured by the air-fuel ratio sensors when the air-fuel ratio is changed, wherein parameter $\beta$ is identified by minimizing an error function $S_{error}$ expressed as $$S_{error} = \sum_{i=1}^{n} (Y_i - \beta X_i)^2,$$

wherein n is a number of measured samples of the upstream air-fuel ratio X and the downstream air-fuel ratio Y; and
   means for determining a state of the catalyst based on the identified parameter.

2. The apparatus as claimed in claim 1, wherein said means for identifying sets at least one of the number of samplings and a sampling period for measuring the air-fuel ratio in the upstream side and downstream side of the catalyst based on at least one of an exhaust gas flow amount, an exhaust gas temperature, a catalyst temperature, variation degree of a target air-fuel ratio, and variation amount of the air-fuel ratio.

3. The apparatus as claimed in claim 2, further comprising:
   a memory storing base threshold values for said parameter; and
   wherein said means for determining establishes a threshold value by modifying said base threshold values based on at least one of amount of oxygen adsorbed in the catalyst, a catalyst temperature a target air-fuel ratio, and determines a state of the catalyst by comparing said parameter with the threshold value.

4. The apparatus as claimed in claim 1, wherein the catalyst model is expressed by $Y=\beta X$, X being air-fuel ration in the upstream side of the catalyst, Y being air-fuel ratio in the downstream side of the catalyst, and $\beta$ being a value to be determined by sample values of X and Y, said apparatus further comprising:
   means for determining a minimal of $\beta$ based on the error function $S_{error}$ and sample values of X and Y, said minimal being an identifying parameter $\beta_{min}$.

5. The apparatus as claimed in claim 4, further comprising:
   a memory storing threshold values for said identifying parameter $\beta_{min}$; and
   wherein said means for determining a state of the catalyst compares said identifying parameter $\beta_{min}$ with the threshold values to determine a state of the catalyst.

6. The apparatus as claimed in claim 5, further comprising:
   means for modifying said threshold values based on at least one of amount of oxygen adsorbed in the catalyst, a catalyst temperature a target air-fuel ratio, and determines a state of the catalyst by comparing said parameter with the threshold value.

7. The apparatus as claimed in claim 5, wherein said means for determining a state of the catalyst determines that the catalyst has deteriorated when said identifying parameter $\beta_{min}$ is smaller than the threshold as defined by said threshold values.

8. A method for detecting deterioration of a catalyst provided in an exhaust system of an internal-combustion engine, comprising:
   providing air-fuel ratio sensors in the upstream side and the downstream side of the catalyst for measuring air-fuel ratio in the exhaust gas;

changing the air-fuel ratio in the exhaust gas;

identifying a parameter β of a catalyst model representing deterioration state of the catalyst in accordance with variation of the air-fuel ratio in the upstream side and the downstream side of the catalyst as measured by the air-fuel ratio sensors when the air-fuel ratio is changed, wherein parameter β is identified by minimizing an error function $S_{error}$ expressed as $$S_{error} = \sum_{i=1}^{n} (Y_i - \beta X_i)^2,$$

wherein n is a number of measured samples of the upstream air-fuel ratio X and the downstream air-fuel ratio Y; and determining a state of the catalyst based on the identified parameter.

9. The method as claimed in claim 8, further comprising:
setting at least one of the number of samplings and a sampling period for measuring the air-fuel ratio in the upstream side and downstream side of the catalyst based on at least one of an exhaust gas flow amount, an exhaust gas temperature, a catalyst temperature, variation degree of a target air-fuel ratio, and variation amount of the air-fuel ratio.

10. The method as claimed in claim 9, further comprising:
reading base threshold values for said parameter from a memory; and
modifying said base threshold values based on at least one of amount of oxygen adsorbed in the catalyst, a catalyst temperature a target air-fuel ratio, and determines a state of the catalyst by comparing said parameter with the threshold value.

11. The method as claimed in claim 8, wherein the catalyst model is expressed by Y=βX, X being air-fuel ration in the upstream side of the catalyst, Y being air-fuel ratio in the downstream side of the catalyst, and β being a value to be determined by sample values of X and Y, said method further comprising:
determining a minimal of β based on the error function $S_{error}$ and sample values of X and Y, said minimal being an identifying parameter $\beta_{min}$.

12. The method as claimed in claim 11, further comprising:
reading threshold values for said identifying parameter $\beta_{min}$ from a memory; and
determining a state of the catalyst by comparing said identifying parameter $\beta_{min}$ with the threshold values.

13. The method as claimed in claim 11, further comprising:
reading base threshold values for said identifying parameter $\beta_{min}$ from a memory;
modifying said base threshold values based on at least one of amount of oxygen adsorbed in the catalyst, a catalyst temperature a target air-fuel ratio; and
determining a state of the catalyst by comparing said identifying parameter $\beta_{min}$ with the modified threshold values.

14. The method as claimed in claim 12, wherein the catalyst is determined to have deteriorated when said identifying parameter $\beta_{min}$ is smaller than the threshold as defined by said threshold values.

15. The method as claimed in claim 13, wherein the catalyst is determined to have deteriorated when said identifying parameter $\beta_{min}$ is smaller than the threshold as defined by said modified threshold values.

16. A non-transitory computer readable medium for storing a computer program for detecting deterioration of a catalyst provided in an exhaust system of an internal-combustion engine having air-fuel ratio sensors in the upstream side and the downstream side of the catalyst for measuring air-fuel ratio in the exhaust gas, said computer program, when executed, performing:

changing the air-fuel ratio in the exhaust gas;

identifying a parameter β of a catalyst model representing deterioration state of the catalyst in accordance with variation of the air-fuel ratio in the upstream side and the downstream side of the catalyst as measured by the air-fuel ratio sensors when the air-fuel ratio is changed, wherein parameter β is identified by minimizing an error function $S_{error}$ expressed as $$S_{error} = \sum_{i=1}^{n} (Y_i - \beta X_i)^2,$$

wherein n is a number of measured samples of the upstream air-fuel ratio X and the downstream air-fuel ratio Y; and determining a state of the catalyst based on the identified parameter.

17. The medium as claimed in claim 16, wherein the catalyst model is expressed by Y=βX, X being air-fuel ration in the upstream side of the catalyst, Y being air-fuel ratio in the downstream side of the catalyst, and β being a value to be determined by sample values of X and Y, said computer program further performing:
determining a minimal of β based on the error function $S_{error}$ and sample values of X and Y, said minimal being an identifying parameter $\beta_{min}$.

18. The medium as claimed in claim 17, said computer program further performing:
reading threshold values for said identifying parameter $\beta_{min}$ from a memory; and
determining a state of the catalyst by comparing said identifying parameter βhd min with the threshold values.

19. The medium as claimed in claim 17, said computer program further performing:
reading base threshold values for said identifying parameter $\beta_{min}$ from a memory;
modifying said base threshold values based on at least one of amount of oxygen adsorbed in the catalyst, a catalyst temperature a target air-fuel ratio; and
determining a state of the catalyst by comparing said identifying parameter $\beta_{min}$, with the modified threshold values.

20. The medium as claimed in claim 18, said computer program further performing:
determining the catalyst to have deteriorated when said identifying parameter $\beta_{min}$ is smaller than the threshold as defined by said threshold values.

* * * * *